United States Patent [19]

Peilloud et al.

[11] Patent Number: 5,158,374
[45] Date of Patent: Oct. 27, 1992

[54] BEARING OR ROLLER BEARING WITH INFORMATION SENSOR

[75] Inventors: Fernand Peilloud, Alby-Sur-Cheran; Roger Guers, Seynod; Georges Godard, Poisy Chef-Leiu, all of France

[73] Assignee: The Torrington Company, Torrington, Conn.

[21] Appl. No.: 590,447

[22] Filed: Sep. 19, 1990

Related U.S. Application Data

[63] Continuation of Ser. No. 292,852, Jan. 3, 1989, abandoned.

[30] Foreign Application Priority Data

Jan. 7, 1988 [FR] France ............................ 88 00121

[51] Int. Cl.⁵ .............................................. F16C 33/58
[52] U.S. Cl. .............................................. 384/448
[58] Field of Search ............... 384/448, 903, 490, 482; 340/682

[56] References Cited

U.S. PATENT DOCUMENTS

| | | | |
|---|---|---|---|
| 4,732,494 | 3/1988 | Guers et al. | 384/448 |
| 4,783,180 | 11/1988 | Hayashi | 384/448 |
| 4,795,278 | 1/1989 | Hayashi | 384/448 |

Primary Examiner—Lenard A. Footland
Attorney, Agent, or Firm—John C. Bigler

[57] ABSTRACT

Bearing or roller bearing with information sensor, of the type comprising a stationary element carrying at least one magnetic field sensor device and one rotating element carrying a multipole magnetized ring coaxial to said moving element, which rotates in front of the sensor device and in which the ring is mounted in a support carried by said rotating element and is separated from the sensor device by an air gap, characterized in that the ring is provided with circumferentially distributed notches.

1 Claim, 2 Drawing Sheets

BEARING OR ROLLER BEARING WITH INFORMATION SENSOR

This application is a continuation of application Ser. No. 292,852, filed Jan. 3, 1989.

The invention pertains to a bearing or roller bearing with an information sensor, of the type comprising a stationary element carrying at least one magnetic field sensor device and one rotating element carrying a multipole magnetized ring coaxial to said rotating element, which moves in front of the sensor device, and in which the ring is mounted in a nonmagnetic support carried by said rotating element and is separated from the sensor device by an air gap. One such bearing has been described in U.S. Pat. No. 4,732,494.

More specifically, the invention pertains to a process for producing the magnetized ring with good magnetization precision. Another object of the invention is a sealed roller bearing with information sensor which makes use of the magnetized ring.

The Applicants have observed that precise measurement of rotational speed, especially in installation applications for speed-sensing bearings or roller bearings in the automobile industry, requires that the magnetized ring be produced with successive poles at constant pitch with a high degree of magnetization precision and a tolerance reduced to about 1%.

According to one aspect of the invention, the ring, previously secured on its rotating support, is subjected to a dividing operation before being penetrated by a flux of magnetic force produced by a magnetic field coaxial to the axis of rotation of the ring, the lines of force of which are thus parallel.

The resulting invention thus furnishes the means necessary for achieving sufficient magnetization precision in the magnetized ring.

Other characteristics and advantages of the invention can be derived from the description which follows, which refers to the attached drawings, in which.

Figure 1:
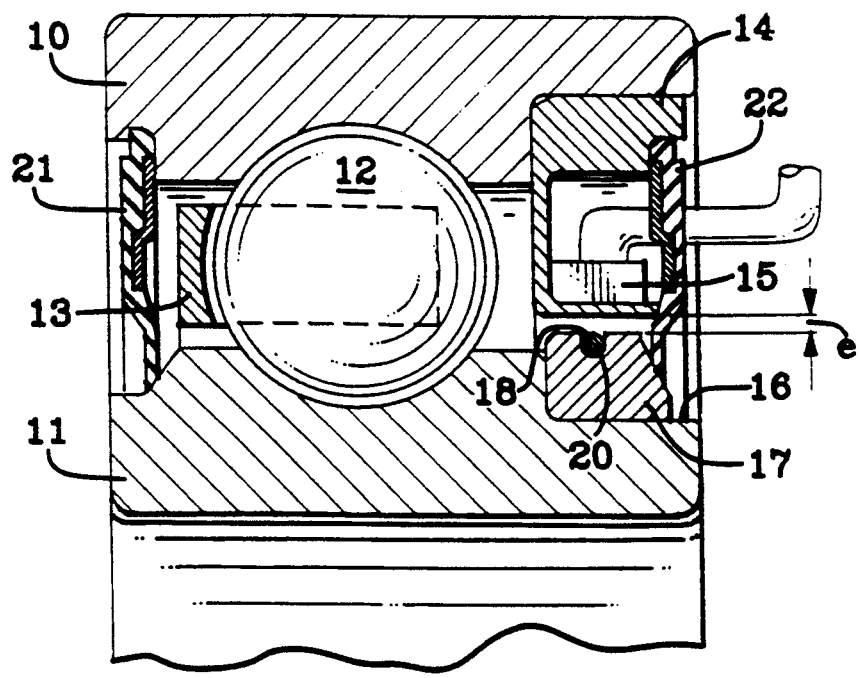
FIG. 1 is a view of an axial cross section of the roller bearing.

According to FIG. 1, the ball bearing has an outer ring 10 and an inner ring 11 capable of being either fixed or rotating, depending on the mounting system used.

Rings 10 and 11 have raceways for rolling elements 12 in a cage 13, which retains them and provides angular positioning for them.

Outer ring 10, which is assumed to be fixed, carries a radial lip seal 21 in contact with inner ring 11 and a deflector 14, which defines a cavity in which a sensor 15 is located.

Another radial lip seal 22 is retained in a recess in deflector 14 and allows the connecting wires to the sensor to pass through.

Inner ring 11, which is assumed to be rotating, has an installation surface 16 for a support ring 17 of a magnetic or nonmagnetic material, immobilized against rotation by cementing, pressing, or any other means.

Ring 17 has a groove 18, the radial opening of which is separated from sensor 15 in deflector 14 by an air gap e, the dimensions of which vary depending on the size of the bearing.

A magnetized ring 20 is housed in groove 18. As an example, ring 20 can be made either of a treated metallic alloy or made from iron oxide and a plastic binder capable of being cast, machined, and radially magnetized. Ring 20 can, depending on the type of magnetization, be attached directly to steel ring 11 of the bearing and form, along with a carrier element 17, a single part capable of producing magnetic fields sufficient for stationary sensor 15.

Figure 2:
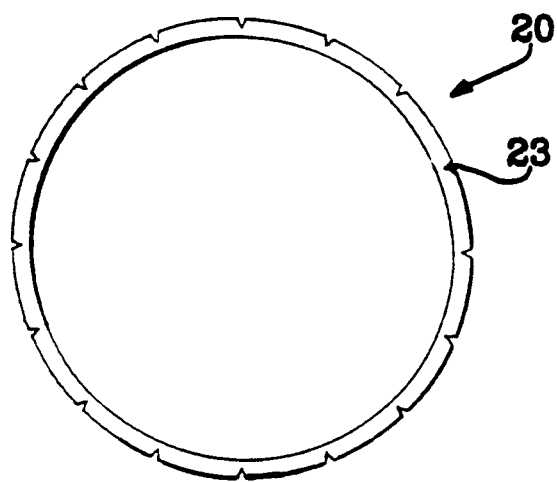
FIGS. 2 and 3 are front views of two embodiments of the ring.
Figure 3:
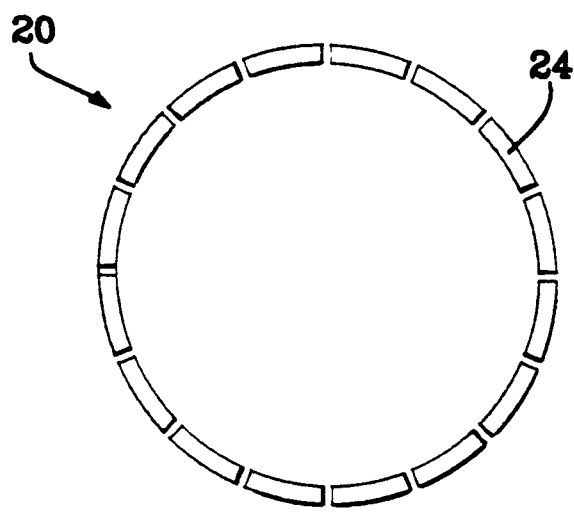

With the aim of improving the magnetization quality of ring 20 (equal field length and strength for each pole), ring 20 comprises notches 23, shown in FIG. 2, or segments produced by division into sections, as shown in FIG. 3. In this case, ring 20 is cut into sections after it has been crimped or mounted in its support 17.

It is advantageous to create the notches or sections by the use of a precision cutting machine, which can produce regular polarity with excellent precision.

As an example, the circular polarization of the ring is produced, after the latter has been divided, by means of the magnetic flux produced by a field coaxial to the axis of rotation of the magnet by the use of the magnetoscopy technique. In this case, the notches or cuts generate leakage lines where the magnetic field is very intense over a short distance.

When the method of circular magnetization is used, the sectioned poles provide a more intense field than the notched poles. It is possible to exploit this difference to create an imaginary reference mark at each revolution. If, on a ring notched at each pole, only one of the poles is sectioned, an auxiliary sensor can be positioned so that it is sensitive only to the greater field intensity.

Figure 4:
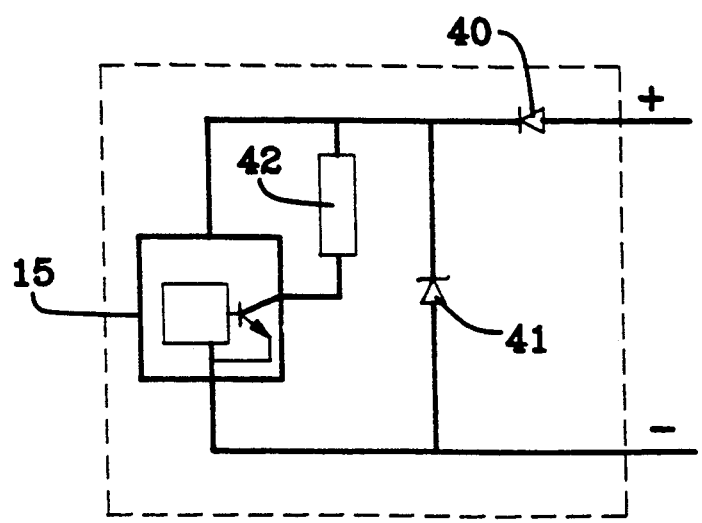
FIG. 4 is a diagram of the sensor protection circuit.

Under severe application conditions such as those encountered in the automobile industry, sensor 15 is accompanied by a protection circuit, especially to protect against overvoltages and polarity reversals, and/or a two-wire connection as shown schematically in FIG. 4.

According to the diagram, a Zener diode 41 protects sensor 15 against overvoltages at the + and − terminals of the circuit. A diode 40 provides protection against polarity reversals at these same terminals.

A resistor 42 drops the voltage of the signal emitted by the sensor.

The circuit also makes available four distinct output voltage levels:

two levels, representing the low level ("0") and the high level ("1") during normal operation;

a zero supply voltage level in the event of a short circuit between the output conductors;

a maximum supply voltage level in the event of an interruption in one of the connections to resistor 42.

It is thus possible to monitor the operation of sensor 15.

The invention is by no means limited to the embodiment described and shown here by way of example. In particular, the invention embraces technical means equivalent to the means described or combinations thereof to the extent that the latter are implemented in the spirit of the invention or carried out in the context of a measurement of speed information.

We claim:

1. A bearing with an information sensor, said bearing comprising an outer ring carrying at least one magnetic field sensor device and an inner ring carrying a multipole magnetized ring coaxial to said inner ring, said magnetized ring being positioned so as to rotate in front of said at least one sensor device and separated from said sensor device by an air gap, and being mounted in a support ring carried by said inner ring, said magnetized ring also being provided with a plurality of circumferentially distributed spaces to provide areas of greater field intensity, wherein the plurality of circumferentially distributed spaces include at least one space extending radially completely through the magnetized ring and a plurality of circumferentially distributed notches.

* * * * *